(12) United States Patent
Morita et al.

(10) Patent No.: US 7,951,234 B2
(45) Date of Patent: *May 31, 2011

(54) WATER-SOLUBLE AZO COMPOUND OR SALT THEREOF, INK COMPOSITION AND COLORED PRODUCT

(75) Inventors: Ryoutarou Morita, Tokyo (JP); Yoshiaki Kawaida, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/734,660

(22) PCT Filed: Oct. 17, 2008

(86) PCT No.: PCT/JP2008/002946
§ 371 (c)(1),
(2), (4) Date: May 14, 2010

(87) PCT Pub. No.: WO2009/066412
PCT Pub. Date: May 28, 2009

(65) Prior Publication Data
US 2010/0233450 A1 Sep. 16, 2010

(30) Foreign Application Priority Data
Nov. 20, 2007 (JP) ................ 2007-300005

(51) Int. Cl.
*C09D 11/02* (2006.01)
*C09B 33/12* (2006.01)
*B41J 2/01* (2006.01)

(52) U.S. Cl. .......... 106/31.48; 534/797; 347/100

(58) Field of Classification Search ........... 106/31.48; 534/797; 428/195.1; 347/100
See application file for complete search history.

(56) References Cited

U.S. PATENT DOCUMENTS

| | | | |
|---|---|---|---|
| 3,945,990 A * | 3/1976 | Ikeda et al. | 534/797 |
| 5,268,459 A | 12/1993 | Gregory et al. | |
| 5,374,301 A * | 12/1994 | Gregory et al. | 106/31.48 |
| 5,622,550 A | 4/1997 | Konishi et al. | |
| 6,290,763 B1 * | 9/2001 | Millard et al. | 106/31.48 |
| 6,844,428 B2 | 1/2005 | Hasemann et al. | |
| 6,867,286 B1 * | 3/2005 | Holloway et al. | 534/797 |
| 7,150,783 B2 * | 12/2006 | Oshaughnessy et al. | 106/31.48 |
| 7,163,576 B2 * | 1/2007 | Oshaughnessy et al. | 106/31.48 |
| 7,740,696 B2 | 6/2010 | Takahashi et al. | |
| 7,771,525 B2 * | 8/2010 | Morita et al. | 106/31.48 |
| 2004/0068102 A1 * | 4/2004 | Holloway et al. | 534/632 |
| 2004/0111813 A1 | 6/2004 | Hasemann et al. | |
| 2009/0117341 A1 | 5/2009 | Takahashi et al. | |
| 2009/0130399 A1 * | 5/2009 | Takahashi et al. | 106/31.48 |
| 2010/0118067 A1 * | 5/2010 | Morita et al. | 347/100 |

FOREIGN PATENT DOCUMENTS

| | | |
|---|---|---|
| JP | 4-233975 A | 8/1992 |
| JP | 7-173422 A | 7/1995 |
| JP | 7-238245 A | 9/1995 |
| JP | 8-325493 A | 12/1996 |
| JP | 2004-515597 A | 5/2004 |
| JP | 2008-56830 A | 3/2008 |
| JP | 2008-88281 A | 4/2008 |
| WO | WO 2007/049366 A1 | 5/2007 |

OTHER PUBLICATIONS

International Search Report dated Nov. 18, 2008.

* cited by examiner

*Primary Examiner* — Helene Klemanski
(74) *Attorney, Agent, or Firm* — Nields, Lemack & Frame, LLC

(57) ABSTRACT

The present invention relates to a water-soluble azo compound represented by the following formula (1) or a salt thereof:

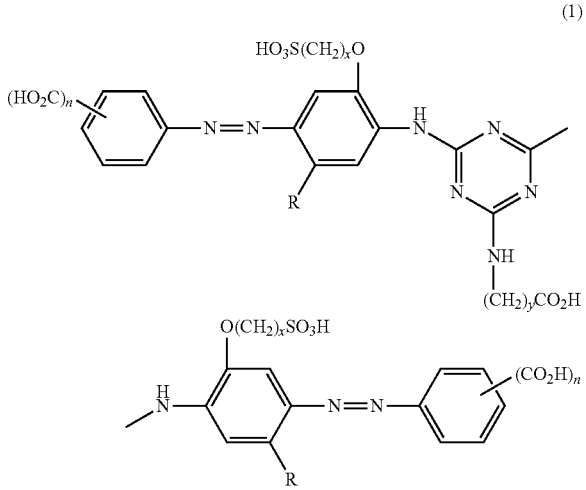

(1)

wherein, R represents an alkyl group having 1 to 4 carbon atoms, n represents an integer number of 1 or 2, x represents an integer number of 2 to 4 and y represents an integer number of 2 to 11, respectively and an ink composition containing this; and provides a yellow coloring matter which has a highly vivid hue suitable for inkjet recording, gives various high fastnesses to recorded matter and is excellent in storage stability when prepared as an ink composition, and an ink composition containing this.

11 Claims, No Drawings

WATER-SOLUBLE AZO COMPOUND OR SALT THEREOF, INK COMPOSITION AND COLORED PRODUCT

TECHNICAL FIELD

The present invention relates to a water-soluble disazo compound or a salt thereof, an ink composition containing this, and a colored product colored with this.

BACKGROUND ART

As for the recording method by means of an inkjet printer which is one of the typical methods among various color recording methods, various methods for discharging ink have been developed, and in any of the methods, ink droplets are generated and adhered onto various record-receiving materials (such as paper, film and cloth) to perform recording. This method has been rapidly prevailing lately and is expected to continue growing remarkably in the future because of features such as quietness without noise generation due to no direct contact of a recording head with a record-receiving material and as easiness in downsizing, speeding up and colorizing. Conventionally, as an ink for fountain pens, felt-tip pens or the like and as an ink for inkjet recording, inks where a water-soluble dye is dissolved in an aqueous medium have been used, and in these water-based inks, a water-soluble organic solvent is generally added to prevent ink from clogging at a pen tip or an inkjet nozzle. These inks are required to provide recorded images with sufficient density, not to clog at a pen tip or a nozzle, to dry quickly on a record-receiving material, to bleed less, to have excellent storage stability, and so on. In addition, recorded images formed are required to have fastnesses such as water fastness, moisture fastness, light fastness and gas fastness.

Clogging at the nozzle of an inkjet is often due that water in an ink evaporates around of the nozzle before the other solvent and additive do, resulting in the compositional condition that water remains less while the other solvent and additive remain more whereby the coloring matter crystallizes and precipitates. Therefore, it is one of the very important performances required that crystals hardly precipitate even when the ink is dried by evaporation. In addition, for this reason, high solubility in solvents and additives is one of the properties required for coloring matters.

Meanwhile, in order that images or character information on a color display of a computer are recorded in color by an ink jet printer, subtractive color mixture of 4 color inks of yellow (Y), magenta (M), cyan (C) and black (K) is generally used, by which recorded images are expressed in color. In order that images by additive color mixture of red (R), green (G) and blue (B) on CRT (cathode ray tube) displays and the like are, as faithfully as possible, reproduced with images by subtractive color mixture, it is desired that coloring matters to be used for inks, particularly of Y, M and C, have respectively a hue close to each standard and also are vivid. In addition, it is required that the inks are stable in storage for a long period of time, and that images printed as the above have a high concentration and also the images are excellent in fastnesses such as water fastness, moisture fastness, light fastness, and gas fastness.

With the recent development of the inkjet techniques, improvement of inkjet printing speed is remarkable and there is a move to use an inkjet printer, as well as a laser printer using an electronic toner, for document printing on plain paper which is a major application in the office environment. The inkjet printer has some such advantages that there is no need to select the recording paper type and inkjet printers are inexpensive, and therefore it is becoming widespread particularly in small to medium scale office environments such as Small Office Home Office (SOHO). When an inkjet printer is thus used for application of printing on plain paper, there is a tendency that hue, coloring density and water fastness are more emphasized among the qualities required for printed matters. In order to satisfy these performances, a method using a pigment ink has been proposed, but using a pigment ink poses problems such as its own instability and clogging at the head nozzle because the pigment ink is an ink whose coloring matter is not dissolved in a water-based ink and which is in a dispersion state. In addition, when a pigment ink is used, a problem often arises in abrasion resistance, too. Although it is said that dye inks relatively hardly pose such problems, in particular the water fastness thereof is extremely inferior compared with pigment inks, whereby improvement of water fastness thereof is strongly desired. Further, unlike pigment ink, dye ink penetrates rapidly in the depth direction after printed on the surface of plain paper, resulting in that a problem of decrease in coloring density is easily posed.

Many proposals have been made to the problem of improvement of water fastness on plain paper through the ages. As a yellow coloring matter for inkjet which is excellent in water fastness and whose hue and light fastness are improved, for example, a dye described in Patent Literature 1 is proposed. In addition, a yellow dye for inkjet which is good in light fastness and ozone fastness is proposed in Patent Literature 2, where there is no detailed description about water fastness on plain paper.

Patent Literature 1: JP H4-233975 A
Patent Literature 2: JP 2006-152264 A

DISCLOSURE OF THE INVENTION

Problems to Be Solved by the Invention

As for the dye described in Patent Literature 1, the water fastness thereof is very excellent against certain kinds of plain paper but it cannot be said that the high water fastness widely exerts the effect on many kinds of plain paper commercially available. In addition, as for the dye described in Patent Literature 1, the color saturation as yellow when printed is low and thus the range of color to be exhibited is narrow particularly on plain paper. Therefore, development of a yellow coloring matter whose water fastness, color saturation, in addition, hue, print density and the like are further improved has been required. Further, the dye described in Patent Literature 1 has a problem that the coloring density as yellow on plain paper is low.

Furthermore, the coloring matter described in Patent Literature 2 is very excellent in moisture fastness, the ozone gas fastness and light fastness on glossy paper having an ink receiving layer comprising a white inorganic pigment, but the water fastness thereof on plain paper is not disclosed and actually it is not said that the color saturation and coloring density thereof on plain paper are sufficient.

Therefore, development of a yellow coloring matter whose water fastness, color saturation, in addition, hue, coloring density and the like are further improved is required.

It is an object of the present invention to provide a water-soluble yellow coloring matter (compound) which has high solubility in water or a water-soluble organic solvent, a hue and color saturation suitable for inkjet recording and a high coloring density and allows excellent fastnesses, such as light fastness, gas fastness, moisture fastness and particularly water fastness on plain paper, of recorded matter, and to provide an ink composition containing it which has good storage stability.

Means of Solving the Problems

The present inventors have intensively studied to solve the above problems and found that a water-soluble disazo compound represented by a particular formula and an ink composition containing it can solve the above problems, and have completed the present invention.

That is, the present invention relates to:
(1) A water-soluble azo compound represented by the following formula (1) or a salt thereof:

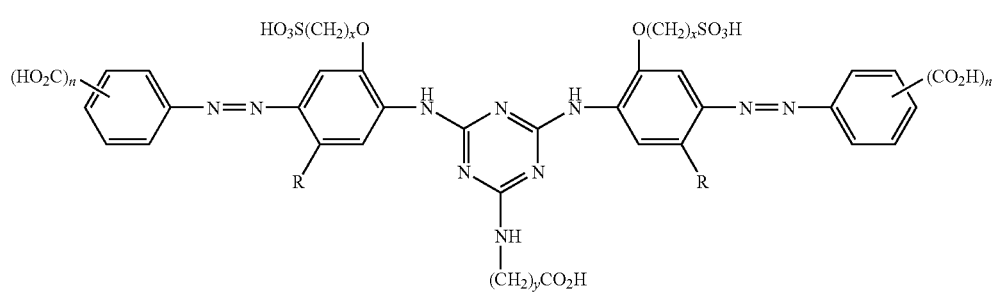

(wherein, R represents an alkyl group having 1 to 4 carbon atoms, n represents 1 or 2, x represents an integer number of 2 to 4 and y represents an integer number of 2 to 11, respectively),
(2) The water-soluble azo compound or a salt thereof according to the above (1), wherein in the formula (1), R is a methyl group, n is 1, x is 3 and y is from 5 to 11,
(3) The water-soluble azo compound or a salt thereof according to the above (1), which is represented by the following formula (2):

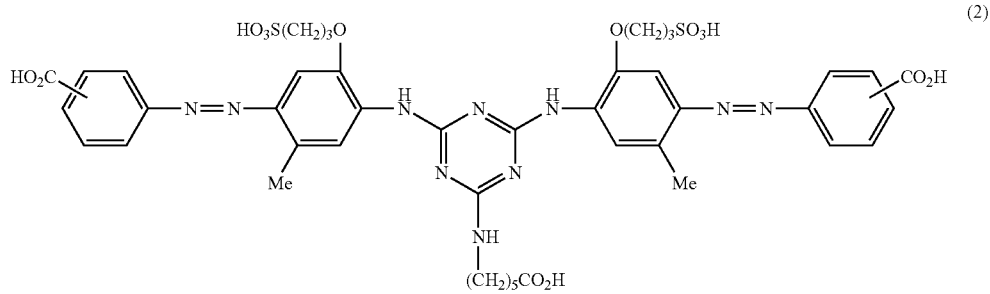

(wherein, Me represents a methyl group),
(4) An ink composition containing the water-soluble azo compound or a salt thereof according to any one of the above (1) to (3) or (13) described later,
(5) The ink composition according to the above (4), which contains a water-soluble organic solvent,
(6) The ink composition according to the above (4) or (5), which is for inkjet recording,
(7) An inkjet recording method characterized by that an ink droplet of either the ink composition according to the above (4) or the ink composition according to (4) containing a water-soluble organic solvent is discharged responding to a recording signal to perform recording on a record-receiving material,
(8) The inkjet recording method according to the above (7), wherein the record-receiving material is a communication sheet,
(9) The inkjet recording method according to the above (8), wherein the communication sheet is a plain paper or a sheet having an ink receiving layer containing a porous white inorganic substance,
(10) A colored product colored with any of (a) the water-soluble azo compound or a salt thereof according to any one of the above (1) to (3), (b) an ink composition containing the water-soluble azo compound or a salt thereof according to any one of the above (1) to (3), or (c) an ink composition containing the water-soluble azo compound or a salt thereof according to any one of the above (1) to (3) and a water-soluble organic solvent,
(11) The colored product according to the above (10), wherein coloring is performed by an inkjet printer,
(12) An inkjet printer comprising a container containing the ink composition according to any one of the above (4) to (6),
(13) The water-soluble azo compound or a salt thereof according to the above (1), wherein in the formula (1), y is an integer number of 3 to 11.

Effect of the Invention

The water-soluble azo compound represented by the above formula (1) of the present invention or a salt thereof has an excellent solubility in water and water-soluble organic solvents. In addition, it has a characteristic of having good filterability through, for example, membrane filters in the process of producing an ink composition, and gives a yellow hue which is very vivid and has high color saturation and a high density on plain paper and special paper for inkjet recording. Further, the ink composition of the present invention containing this compound is free from crystal precipitation, changes in physical properties and hue, and the like after storage for a long period of time, and thus its storage stability is extremely good. And printed matter by using the ink composition of the present invention as an ink for inkjet recording has an ideal hue as a yellow hue without selecting a record-receiving material (for example, paper, film and the like), and it is also possible to faithfully reproduce photo-like color images on paper.

Furthermore, the ink composition of the present invention exhibits extremely improved water fastness on plain paper, compared with conventional dye inks. Moreover, even when recorded on a record-receiving material coated with a porous white inorganic substance on the surface, such as inkjet special paper and film for photo image quality, it exhibits good fastnesses and specifically water fastness, moisture fastness, gas fastness and light fastness thereof are good, whereby it allows excellent long-term storage stability of photo-like recorded image. Thus, the water-soluble azo compound of the formula (1) is extremely useful for inkjet recording inks, particularly as a yellow coloring matter for inks.

BEST MODE FOR CARRYING OUT THE INVENTION

The present invention will be specifically explained. In this regard, acidic functional groups such as a sulfo group and a carboxy group are shown in free acid form in the present description, unless otherwise noted.

In addition, hereinafter in the present description, "the water-soluble azo compound of the present invention or a salt thereof" or "the compound of the present invention" is, for convenience, referred to as "the coloring matter of the present invention" or in some cases, as only "the coloring matter", unless otherwise noted. Further, in each formula of the present description, Me represents a methyl group.

The coloring matter of the present invention is represented by the above formula (1).

In the formula (1), R represents an alkyl group having 1 to 4 carbon atoms, n represents an integer number of 1 or 2, x represents an integer number of 2 to 4, and y represents an integer number of 2 to 11, respectively.

In the formula (1), R represents an alkyl group having 1 to 4 carbon atoms and is preferably a methyl group.

In the formula (1), n represents 1 or 2 and is preferably 1. In this regard, the substitution position of a carboxy group represented by $-(CO_2H)_n$ may be any of the ortho-position, the meta-position and the para-position to the azo group and is preferably the meta-position.

x represents 2 to 4 and is preferably 3.

In the formula (1), y represents an integer number of 2 to 11. It is preferably 3 to 11, more preferably 5 to 11, and particularly preferably 5.

Among coloring matters represented by the formula (1), coloring matters having a combination of any one of the above R, n, x and y being a preferable one or a particularly preferable one with the others are preferred; coloring matters having a combination where any two thereof are preferable ones or particularly preferable ones and the others are preferable ones are more preferred; and coloring matters having a combination where any three thereof are preferable ones or particularly preferable ones and the other is preferable one are further preferred.

For example, in the above formula (1), a compound where y is 3 to 11 is one of the preferable compounds; among coloring matters represented by the formula (1), coloring matters having a combination where R is a methyl group, n is 1, x is 3 and y is 3 to 11 and more preferably 5 to 11 are more preferred; and the coloring matter represented by the above formula (2) is most preferred.

The compound of the above formula (1) is also present as free acid or a salt thereof. The salt of the compound of the above formula (1) includes salts with an inorganic or organic cation. Specific examples of the salt of an inorganic cation include alkali metal salts, for example, salts such as lithium salt, sodium salt and potassium salt. Meanwhile, the organic cation includes, for example, quaternary ammonium represented by the following formula (3), but they are not limited to these.

(wherein, $Z^1$ to $Z^4$ represent each independently a hydrogen atom, a C1 to C4 alkyl group, a hydroxy C1 to C4 alkyl group or a hydroxy C1 to C4 alkoxy C1 to C4 alkyl group.)

Herein, examples of the above alkyl group in $Z^1$ to $Z^4$ include methyl, ethyl and the like; likewise, examples of the above hydroxyalkyl group include hydroxymethyl, hydroxyethyl, 3-hydroxypropyl, 2-hydroxypropyl, 4-hydroxybutyl, 3-hydroxybutyl, 2-hydroxybutyl and the like; and further, examples of the above hydroxyalkoxyalkyl group include hydroxyethoxymethyl, 2-hydroxyethoxyethyl, 3-(hydroxyethoxy)propyl, 3-(hydroxyethoxy)butyl, 2-(hydroxyethoxy)butyl and the like.

Preferable ones among the above salts include salts of sodium, potassium, lithium, monoethanolamine, diethanolamine, triethanolamine, monoisopropanolamine, diisopropanolamine and triisopropanolamine, ammonium salt and the like. Among these, more preferable are lithium salt, sodium salt and ammonium salt, and ammonium salt (where in the above formula (3), $Z^1$ to $Z^4$ are hydrogen atoms) is particularly preferable.

As is clear to those skilled in the art, the salt or free acid of the compound of the above formula (1) can be easily obtained by the following method or the like.

For example, a sodium salt of the compound of the above formula (1) can be obtained as a wet cake by adding sodium chloride to a reaction liquid after completion of reaction (reaction liquid before adding 800 parts of acetone in Example 1 described later) or to an aqueous solution dissolving a wet cake containing the compound of the formula (1), a dried form of the compound of the formula (1) or the like, for salting out, and by filtering the precipitated solid.

In addition, the free acid of the compound of the above formula (1) or a mixture of free acid and sodium salt where the compound of the formula (1) is partially sodium salt can be also obtained by dissolving a wet cake of the obtained sodium salt in water, and then by adding an acid such as hydrochloric acid to appropriately adjust the pH and by filtering the precipitated solid.

Further, ammonium salt of the compound of the above formula (1) can be obtained by dissolving a wet cake of the obtained sodium salt or a dried form thereof in water, and then by adding ammonium salt such as ammonium chloride, by adding acid such as hydrochloric acid to appropriately adjust the pH, for example, to pH 1 to 3, and by filtering the precipitated solid. By appropriately adjusting the amount of ammonium chloride to be added or/and the pH, it is also possible to obtain a mixture of ammonium salt of the compound of the formula (1) and sodium salt of the compound of the formula (1), a mixture of free acid and ammonium salt of the compound of the formula (1), or the like.

Furthermore, it is also possible to directly obtain a solid of free acid by, as described later, adding mineral acid to a reaction liquid after completion of the above reaction. In this case, potassium salt, lithium salt, ammonium salt or quaternary ammonium salt corresponding each compound to be added can be also obtained by, for example, while stirring a wet cake of free acid of the compound of the formula (1) together with water, adding potassium hydroxide, lithium hydroxide, ammonia water or hydroxide of the formula (3) thereto for alkalinization. It is also possible to prepare, for example, a mixed salt of lithium salt and sodium salt; further a mixed salt of lithium salt, sodium salt and ammonium salt; and the like, by controlling the mole number of the above salt to be added relative to the number of moles of free acid.

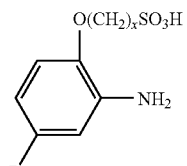
(B)

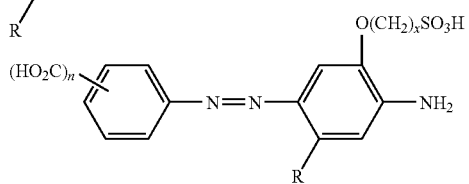
(C)

Next, by condensation of the obtained compound (2 equivalents) of the above formula (C) with cyanuric halide (1 equivalent), for example cyanuric chloride (1 equivalent), at a temperature of 25 to 45° C. and pH 5 to 7.5, a compound of the following formula (D) is obtained.

Formula (D):

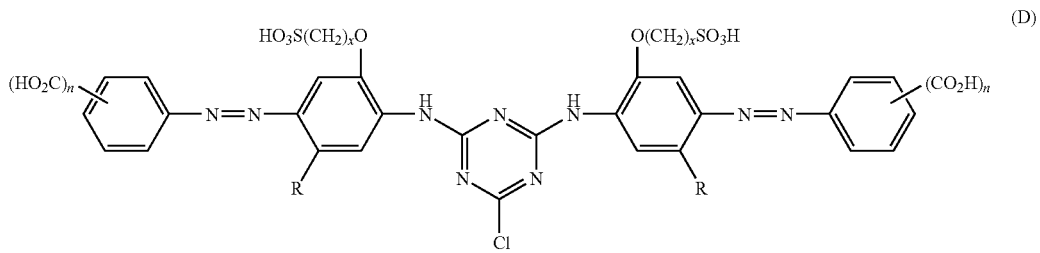
(D)

The physical properties of the compound of the above formula (1) such as solubility, or the ink performance when the compound is used for an ink may be changed depending on the kind of the salt and the like. Therefore, it is also preferred to select the kind of salt according to the intended ink performance.

The coloring matter represented by the above formula (1) of the present invention can be produced, for example, as follows. In this regard, R, n, x and y to be appropriately used in the following formulas (A) to (E) have the same meanings as in the above formula (1), respectively.

By diazotization of an aminobenzene carboxylic acid represented by the following formula (A), and then by coupling reaction with a compound of the following formula (B) at 0 to 25° C. and pH 3 to 4, a compound of the following formula (C) is obtained.

Formulas (A) to (C):

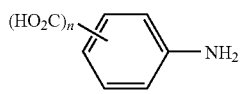
(A)

In addition, by substitution of the chlorine atom in the compound of the above formula (D) with a compound represented by the following general formula (E) under conditions of preferably 75 to 90° C. and pH 7 to 9, the coloring matter of the present invention represented by the above formula (1) can be obtained.

Formula (E):

$H_2N$—$(CH_2)_y$—$CO_2H$ (E)

Specific examples of the compound of the above formula (A) include 4-aminobenzoic acid, 3-aminobenzoic acid, 2-aminobenzoic acid, 5-aminoisophthalic acid, 2-aminoterephthalic acid and the like, and specific examples of the compound of the above formula (B) include 2-(sulfoethoxy)-5-methylaniline, 2-(sulfopropoxy)-5-methylaniline, 2-(sulfobutoxy)-5-methylaniline and the like.

In addition, specific examples of the compound of the above formula (E) include beta-alanine, 4-aminobutyric acid, 5-aminovaleric acid, 6-aminohexanoic acid, 7-aminoheptanoic acid, 12-aminododecanoic acid and the like.

Next, specific examples of the coloring matter of the present invention will be shown in the following table 1. In the table 1, acids such as carboxy and sulfo are shown in free acid form.

TABLE 1
| Compound No. | n | x | y | Structural Formula |
|---|---|---|---|---|
| 1 | 1 | 2 | 5 | 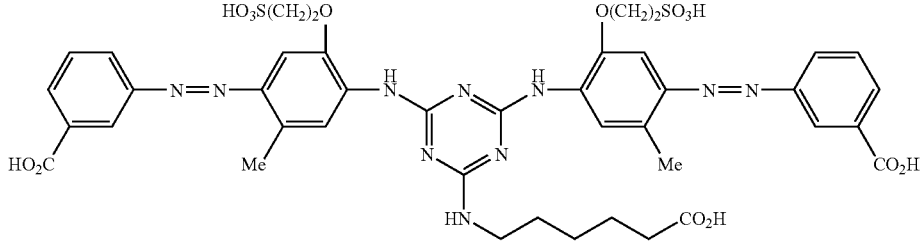 |
| 2 | 1 | 3 | 5 | 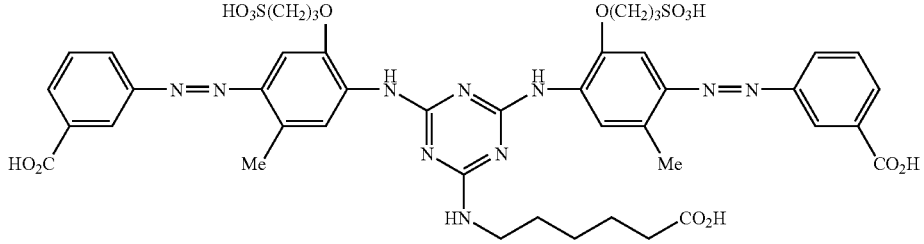 |
| 3 | 1 | 4 | 5 | 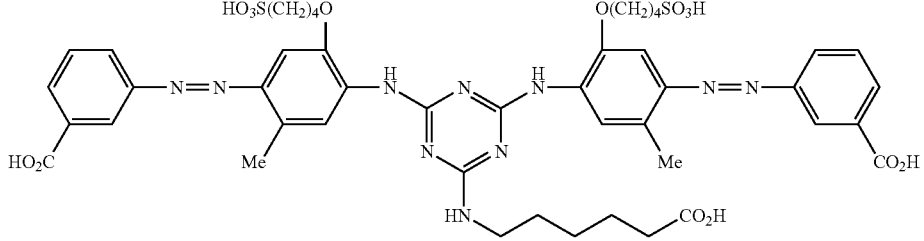 |
| 4 | 1 | 3 | 5 | 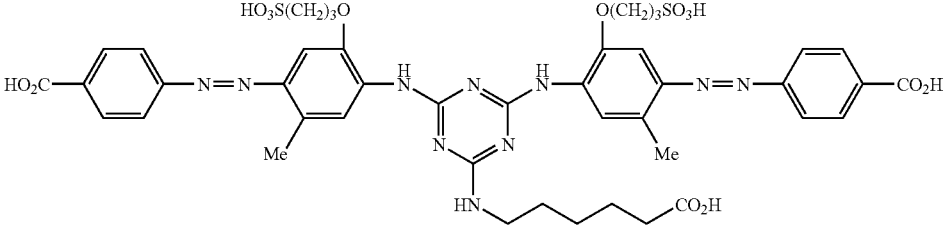 |
| 5 | 1 | 3 | 5 | 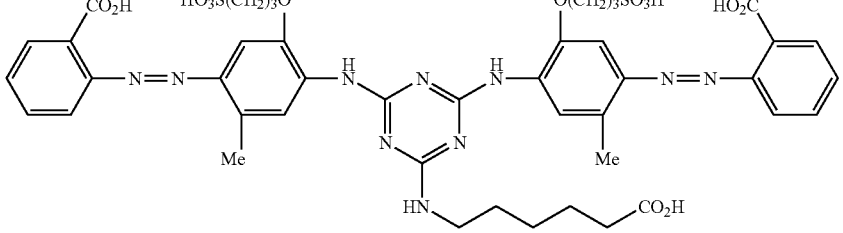 |
| 6 | 2 | 3 | 5 | 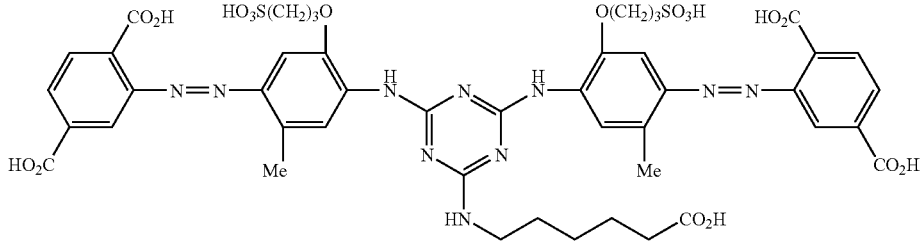 |

TABLE 1-continued

| Compound No. | n | x | y | Structural Formula |
|---|---|---|---|---|
| 7 | 2 | 3 | 5 | (structure) |
| 8 | 1 | 3 | 2 | (structure) |
| 9 | 1 | 3 | 3 | (structure) |
| 10 | 1 | 3 | 4 | (structure) |
| 11 | 1 | 3 | 6 | (structure) |
| 12 | 1 | 3 | 11 | (structure) |

The coloring matter of the above formula (1) of the present invention can be isolated as a solid free acid by adding mineral acid such as hydrochloric acid after completion of reaction, and inorganic salts (inorganic impurities), for example, sodium chloride, sodium sulfate and the like contained as impurities can be removed off by washing the obtained solid of free acid with water or acidic water such as aqueous hydrochloric acid and by the like.

As for the free acid of the coloring matter of the present invention which is obtained as the above, treatment of the obtained wet cake with a desired inorganic or organic base in water as described above gives a solution of a salt of a corresponding coloring matter.

The inorganic base includes, for example, alkali metal hydroxides such as lithium hydroxide, sodium hydroxide and potassium hydroxide or alkali metal carbonates such as lithium carbonate, sodium carbonate and potassium carbonate, ammonium hydroxides and the like.

Examples of the organic base include, for example, organic amine salts represented by the above formula (3), for example, salts of alkanolamine such as diethanolamine and triethanolamine and the like, but not limited thereto.

The coloring matter of the present invention is suitable for dyeing natural and synthetic textiles or blended fabrics, and in addition, for production of ink for writing and ink compositions for inkjet recording.

The reaction liquid containing the coloring matter of the above formula (1) of the present invention (for example, reaction liquid before adding 800 parts of acetone in Example 1 described later) can be also directly used for production of the ink composition of the present invention. However, it is also possible that said compound is isolated from the reaction liquid, for example, by drying the reaction liquid and the like by a method such as spray-drying, and then the resulting compound is processed into an ink composition. The ink composition of the present invention contains the coloring matter of the above formula (1) in an amount of usually 0.1 to 20% by mass, more preferably 1 to 10% by mass and further preferably 2 to 8% by mass in an aqueous solution relative to the total mass of the ink composition.

The ink composition of the present invention is an ink composition where the coloring matter of the above formula (1) is dissolved in water or a mixed solution (which is also referred to as aqueous medium) of water and a water-soluble organic solvent (which is an organic solvent miscible with water), and according to necessity, an ink preparation agent is added. When this ink composition is used as an ink for inkjet printers, it is preferred to use the compound containing a less amount of inorganic impurities such as metal cation chloride, for example sodium chloride, and sulfate, for example sodium sulfate, which are contained as impurities. In this case, the total content of, for example, sodium chloride and sodium sulfate is about 1% by mass or less relative to the total mass of the coloring matter and the lower limit may be 0% by mass, or under the detection limit of a detection apparatus. In order to produce a coloring matter containing a less amount of inorganic substances, desalting treatment may be carried out by, for example, a known method per se using a reverse osmosis membrane, or by a method where a dried form or a wet cake of the compound of the present invention or a salt thereof is stirred in a mixed solvent of C1 to C4 alkanol such as methanol and water for suspension-purification, and the resulting solid is separated by filtration and dried, or the like.

The ink composition of the present invention is prepared using water as a medium, and according to necessity, it may contain a water-soluble organic solvent within the range not impairing the effects of the Invention. The water-soluble organic solvent plays a role as a dye dissolving agent, a drying preventive agent (wetting agent), a viscosity modifier, a penetration enhancer, a surface tension modifier, an antifoaming agent and the like, and it is however used mainly as a drying preventive agent (wetting agent). The other ink preparation agents include, for example, known additives such as an antiseptic and fungicide, a pH adjuster, a chelating agent, a rust preventive agent, an ultraviolet absorbing agent, a viscosity modifier, a dye dissolving agent, an antifading agent, an emulsion stabilizer, a surface tension modifier, an antifoaming agent, a dispersing agent and a dispersion stabilizer. The content of the water-soluble organic solvent is 0 to 60% by mass and preferably 10 to 50% by mass relative to the total mass of the ink; and it is good that an ink preparation agent is used in an amount of 0 to 20% by mass and preferably 0 to 15% by mass to the whole ink. The rest, other than the above water-soluble organic solvent and ink preparation agent and the coloring matter of the above formula (1), is water.

The above water-soluble organic solvent includes, for example, C1 to C4 alkanols such as methanol, ethanol, n-propanol, isopropanol, n-butanol, isobutanol, secondary butanol and tertiary butanol; amides such as N,N-dimethylformamide or N,N-dimethylacetoamide; heterocyclic ketones such as 2-pyrrolidone, N-methyl-2-pyrrolidone, hydroxyethyl-2-pyrrolidone, 1,3-dimethylimidazolidin-2-one or 1,3-dimethylhexahydropyrimid-2-one, ketones or keto alcohols such as acetone, methyl ethyl ketone and 2-methyl-2-hydroxypentan-4-one; cyclic ethers such as tetrahydrofuran and dioxane; mono-, oligo- or poly-alkylene glycols or thioglycols having a C2 to C6 alkylene unit such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, polyethylene glycol, polypropylene glycol or thiodiglycol; polyols (preferably triol) such as trimethylolpropane, glycerine and hexane-1,2,6-triol; C1 to C4 monoalkyl ethers of polyhydric alcohol such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, triethylene glycol monoethyl ether; gamma-butyrolactone; dimethylsulfoxide; or the like.

In this regard, the above water-soluble organic solvents also include solid substances at ordinary temperature, such as trimethylolpropane, for example. However, even when said substances are solid, said substances and the like exhibit water-soluble properties and aqueous solutions containing said substances and the like exhibit the same characteristics as those of a water-soluble organic solvent, whereby they can be used for the same purpose. For this reason, even such solid substances are also included in the category of the water-soluble organic solvent in the present description for convenience as long as they can be used for the above same purpose.

As the above water-soluble organic solvent, preferable are isopropanol, glycerine, mono- di- or triethylene glycol, dipropylene glycol, 2-pyrrolidone, hydroxyethyl-2-pyrrolidone, N-methyl-2-pyrrolidone, trimethylolpropane and butyl carbitol, and more preferably are isopropanol, glycerine, diethylene glycol, 2-pyrrolidone, N-methyl-2-pyrrolidone, trimethylolpropane and butyl carbitol. These water-soluble organic solvents are used alone or as a mixture thereof.

The above an antiseptic and fungicide includes, for example, organic sulfur-based, organic nitrogen sulfur-based, organic halogen-based, haloallylsulfone-based, iodopropargyl-based, N-haloalkylthio-based, benzothiazole-based, nitrile-based, pyridine-based, 8-oxyquinoline-based, isothiazoline-based, dithiol-based, pyridineoxide-based, nitropropane-based, organic tin-based, phenol-based, quaternary ammonium salt-based, triazine-based, thiadiazine-based, anilide-based, adamantane-based, dithiocarbamate-based, brominated indanone-based, benzyl bromoacetate-based and inorganic salt-based compounds.

The organic halogen-based compound includes, for example, sodium pentachlorophenol, the pyridineoxide-based compound includes, for example, sodium 2-pyridinethiol-1-oxide, the isothiazoline-based compound includes, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride and the like.

In addition, the antiseptic and fungicide include sodium acetate, sodium sorbate, sodium benzoate and the like. The other specific examples of the antiseptic and fungicide include, for example, Proxel GXL(S) and Proxel XL-2(S) (which are trade names and manufactured by Avecia Corp.), and the like As the pH adjuster, any substance can be used as long as it can control the pH of ink in the range of 6.0 to 11.0 for the purpose of improving the storage stability of ink. The pH adjuster includes, for example, alkanolamines such as diethanolamine and triethanolamine; alkali metal hydroxides such as lithium hydroxide, sodium hydroxides and potassium hydroxide; ammonium hydroxides; alkali metal carbonates such as lithium carbonate, sodium carbonate and potassium carbonate; or the like.

The chelating agent includes, for example, sodium ethylenediaminetetraacetate, sodium nitrilotriacetate, sodium hydroxyethylethylenediaminetriacetate, sodium diethylenetriaminepentaacetate, sodium uracildiacetate and the like.

The rust preventive agent includes, for example, hydrogen sulfite salt, sodium thiosulfate, ammonium thioglycolate, diisopropylammonium nitrite, pentaerythritol tetranitrate, dicyclohexylammonium nitrite and the like.

The ultraviolet absorbing agent includes, for example, benzophenone-based compounds, benzotriazole-based compounds, cinnamic acid-based compounds, triazine-based compounds and stilbene-based compounds, or a so-called fluorescent brightening agent which is a compound absorbing ultraviolet rays and emitting fluorescence, typified by a benzoxazole-based compound can be also used.

The viscosity modifier includes water-soluble polymer compounds other than the water-soluble organic solvent, for example, polyvinyl alcohol, cellulose derivatives, polyamine, polyimine and the like.

The dye dissolving agent includes, for example, urea, epsilon-caprolactam, ethylene carbonate and the like. It is preferred to use urea.

The antifading agent is used for the purpose of improving the storage stability of images. As the antifading agent, a variety of organic-based and metal complex-based antifading agents can be used. The organic antifading agent includes hydroquinones, alkoxyphenols, dialkoxyphenols, phenols, anilines, amines, indanes, chromans, alkoxyanilines, heterocycles and the like, and the metal complex includes nickel complexes, zinc complexes and the like.

The surface tension modifier includes surfactants, for example, anionic surfactant, amphoteric surfactant, cationic surfactant, nonionic surfactant and the like.

The anionic surfactant includes alkylsulfocarboxylate, alpha-olefin sulfonate, polyoxyethylene alkyl ether acetate, N-acylamino acid and salts thereof, N-acylmethyltaurine salt, alkylsulfate polyoxyalkyl ether sulfate, alkylsulfate polyoxyethylene alkyl ether phosphate, rosin acid soap, castor oil sulfate, lauryl alcohol sulfate, alkylphenol type phosphate ester, alkyl type phosphate ester, alkylallylsulfonate, diethyl sulfosuccinate, diethylhexyl sulfosuccinate, dioctyl sulfosuccinate and the like.

The cationic surfactant includes 2-vinylpyridine derivatives, poly(4-vinylpyridine) derivatives and the like.

The amphoteric surfactant includes lauryldimethylaminoacetic acid betaine, 2-alkyl-N-carboxymethyl-N-hydroxyethyl imidazolinium betaine, coconut oil fatty acid amide propyldimethylaminoacetic acid betaine, polyoctylpolyaminoethylglycine, and in addition, imidazoline derivatives and the like.

The nonionic surfactant includes ether-based ones such as polyoxyethylene nonylphenyl ether, polyoxyethylene octylphenyl ether, polyoxyethylene dodecylphenyl ether, polyoxyethylene oleyl ether, polyoxyethylene lauryl ether and polyoxyethylene alkyl ether; ester-based ones such as polyoxyethylene oleate ester, polyoxyethylene distearate ester, sorbitan laurate, sorbitan monostearate, sorbitan monooleate, sorbitan sesquioleate, polyoxyethylene monooleate, and polyoxyethylene stearate; acetylene glycol (alcohol)-based ones such as 2,4,7,9-tetramethyl-5-decyne-4,7-diol, 3,6-dimethyl-4-octyne-3,6-diol and 3,5-dimethyl-1-hexyn-3-ol; the other specific examples thereof include, for example, Surfynol® 104, 82 and 465 and Olfine STG which are all trade names and manufactured by Nissin Chemical Industry Co., Ltd., and Tergitol® 15-S-7 manufactured by SIGMA-ALDRICH; and the like. In this regard, the superscript RTM stands for a registered trademark in the present description.

As the antifoaming agent, highly oxidized oil-based, glycerin fatty acid ester-based, fluorine-based, silicone-based compounds are used according to necessity.

These ink preparation agents are used alone or as mixture thereof. Meanwhile, the surface tension of the ink of the present invention is usually 25 to 70 mN/m and more preferably 25 to 60 mN/m. In addition, the viscosity of the ink of the present invention is preferably 30 mPa·s or less. Further, it is more preferably adjusted to 20 mPa·s or less.

In production of the ink composition of the present invention, the order to dissolve each agent such as an additive is not particularly limited. In preparation of the ink, water to be used is preferably water with less impurity such as ion-exchanged water or distilled water. In addition, microfiltration may be carried out to remove foreign substances off, using a membrane filter according to necessity, and it is preferred to carry out microfiltration when the ink is used as an ink for inkjet printer. The pore size of a filter to be used in microfiltration is usually 1 μm to 0.1 μm and preferably 0.8 μm to 0.2 μm.

The ink composition containing the coloring matter of the present invention is suitable for use in impress printing, copying, marking, writing, drafting, stamping or recording (printing), particularly in inkjet recording. In addition, the ink composition of the present invention hardly causes crystal precipitation even in the dried state around the nozzle of an inkjet printer, and for this reason, clogging of the head is hardly caused. Further, when the ink composition of the present invention is used in inkjet recording, high quality yellow printed matter having good fastnesses against water, light, ozone, nitrogen oxide gas and friction is obtained, and in particular the water fastness on plain paper is extremely excellent.

In some inkjet printers, two inks of a high concentration ink and a low concentration ink are comprised in a printer for the purpose of providing high resolution images. In the case, using the coloring matter of the present invention, an ink composition where the concentration of the coloring matter is high and an ink composition where the concentration of the coloring matter is low may be produced respectively and they may be used as an ink set. In addition, said coloring matter may be used only in either one. Further, the coloring matter of the present invention may be used in combination with a known yellow coloring matter. Furthermore, the coloring matter of the present invention can be used for color toning of another color, for example, a black ink and for the purpose of preparing a red ink and a green ink by mixing with a magenta coloring matter or a cyan coloring matter.

The colored product of the present invention means a product colored with the coloring matter of the present invention. The materials for the colored product is not particularly limited and may be any, for example, communication sheets such as paper and film, fiber and cloth (cellulose, nylon, wool and the like), leather, substrates for color filters, and the like but not limited thereto as long as it can be colored. The coloring method includes, for example, dip dyeing, printing methods such as textile printing and screen printing, a method using an inkjet printer, and the like, and a method using an inkjet printer is preferable.

The communication sheet is not particularly limited, and those subjected to surface treatment, specifically those where an ink receiving layer is provided on the substrate of paper, synthetic paper, film and the like are used, not to mention plain paper. Herein, the ink receiving layer is a layer having an action of absorbing the ink to speed up drying and it is provided by, for example, a method where a cation polymer is impregnated or coated on the above substrate; a method where inorganic particles capable of absorbing the coloring matter in an ink, such as porous silica, aluminasol and special ceramics, are coated on the above substrate surface together with a hydrophilic polymer such as polyvinyl alcohol and polyvinylpyrrolidone; or the like. Such one as provided with an ink receiving layer is usually referred to as inkjet special paper, inkjet special film, glossy paper, glossy film or the like.

The plain paper means a paper not particularly provided with an ink receiving layer and a number of various plain papers are commercially available according to application. As an example of commercially available plain paper, the plain paper for inkjet includes both sides-high quality plain paper (manufactured by Seiko-Epson Corporation), color plain paper (manufactured by Canon Inc.), Multipurpose Paper and All-in-one Printing Paper (all manufactured by Hewlett Packard), and the like. In addition, paper for plain paper copy (PPC) which is not limited for use in inkjet printing is also a plain paper.

The ink composition of the present invention has particularly excellent water fastness on plain paper as the above, and also has other excellent fastnesses against light, ozone, humidity, friction and the like. It also has excellent water fastness on inkjet special paper, special film, glossy paper, glossy film or the like which are provided with an ink receiving layer for inkjet printing, and it is also good in light fastness, gas fastness, moisture fastness, abrasion resistance and the like on communication sheets In order to perform recording on record-receiving material by the inkjet recording method of the present invention, for example, a container filled with the above ink composition is placed in the predetermined position of an inkjet printer and recording is performed on record-receiving material by an ordinary method. In the inkjet recording method of the present invention, various color inks such as magenta, cyan, and according to necessity, green, blue (or violet), red, black and the like can be used in combination of the ink composition of the present invention. In this case, each color ink is filled into each container and those containers are placed in the predetermined positions of an inkjet printer for use.

The inkjet printer includes, for example, piezo inkjet printer utilizing mechanical vibration and a printer utilizing bubble Jet® type where foam generated by heating is used, and the like. The inkjet recording method of the present invention can be used in any type of printer.

The ink composition of the present invention exhibits vivid yellow, images recorded on plain paper, inkjet special paper and glossy paper therewith have high definition, and it has a hue suitable for the inkjet recording method. In addition, it is characteristic that the recorded images have high fastnesses, particularly very high water fastness on plain paper.

The ink composition of the present invention is free from deposition and separation during storage. When the ink composition of the present invention is used for inkjet recording, crystal precipitation of the ink composition due to drying around the nozzle is quite hardly caused, and therefore the injector (inkhead) is also not clogged. The ink composition of the present invention is free from change in physical properties even in the case where the ink is used in recirculation for relatively long hours by using a continuous ink jet printer and in an intermittent manner by an on-demand printer.

EXAMPLES

Hereinafter, the present invention will be more specifically explained with reference to the Examples. In this regard, "part(s)" and "%" in the context are based on mass unless otherwise specified and the reaction temperature is the internal temperature.

By the way, the λmax (maximum absorption wavelength) of each synthesized compound is shown as a measured value in an aqueous solution of pH 7 to 8. Meanwhile, in the Examples, the present invention is illustrated by an example of sodium salt or ammonium salt, but it is possible to easily obtain an alkali metal salt and a salt with an organic cation by using a suitable method as described above and the present invention is not limited to the Examples.

In addition, acidic functional groups such as carboxy and sulfo are shown in free acid form in each structural formula of the compounds obtained in the Examples.

The solubility of any of the present compounds obtained in the Examples is 50 g/L or more in water at room temperature.

Example 1

In 100 parts of water, 13.7 parts of 3-aminobenzoic acid was dissolved while adjusting to pH 6 with sodium hydroxide, and then 7.2 parts of sodium nitrite was added thereto. After this solution was added dropwise to 100 parts of 5% hydrochloric acid at 0 to 10° C. over 30 minutes, the mixture was stirred at 10° C. or less for 1 hour for diazotization reaction to obtain a reaction liquid containing a diazonium salt.

Next, 24.5 parts of 2-(sulfopropoxy)-5-methylaniline was dissolved in 100 parts of water while adjusting to pH 7 with sodium hydroxide, the resulting solution was added to the reaction liquid containing a diazonium salt obtained in advance, and the mixture was stirred at 0 to 25° C. and pH 3 to 4 for 5 hours. The precipitated solid was separated by filtration to obtain 120 parts of the azo compound of the following formula (4) as a wet cake.

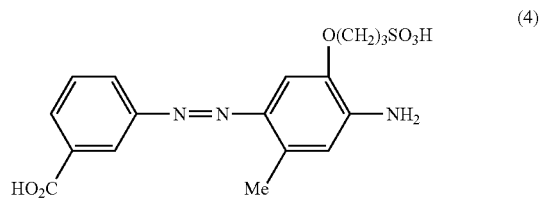

Next, the obtained wet cake of 120 parts of the azo compound of the formula (4) was dissolved in 300 parts of water. To this solution, 0.10 part of surfactant (trade name: LEOCOL® TD50, manufactured by Lion Corporation) was added and the mixture was stirred, 6.4 parts of cyanuric chloride was subsequently added, and then the mixture was stirred at 25 to 45° C. for 6 hours while maintaining the pH at 5 to 7.5 with a 15% aqueous sodium carbonate solution.

Next, 9.3 parts of beta-alanine was added to the resulting reaction liquid and the mixture was stirred at 75 to 90° C. for 6 hours while maintaining the pH at 7 to 9 with a 15% aqueous sodium carbonate solution. After the resulting reaction liquid was cooled to 20 to 40° C., 800 parts of acetone was added to this reaction liquid and the resulting liquid was stirred at 20 to 40° C. for 1 hour. The precipitated solid was separated by filtration to obtain 150 parts of a wet cake. This wet cake was dried at 80° C. using a hot air dryer to obtain 29.0 parts of a water-soluble azo compound of the present invention represented by the following formula (5) as a sodium salt.

Formula (5):

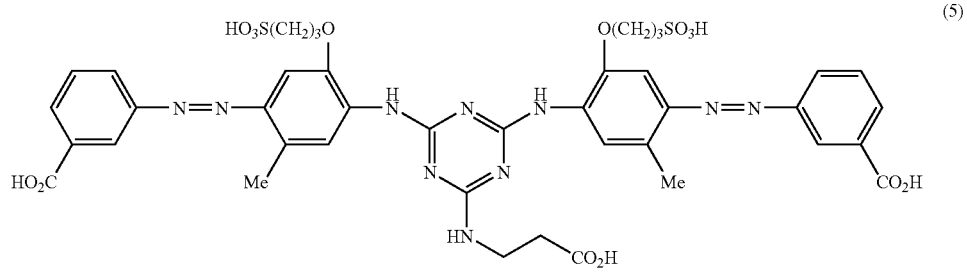

Example 2

In the same manner as in Example 1 except that 13.8 parts of 6-aminohexanoic acid was used instead of 9.3 parts of beta-alanine in Example 1, 30.0 parts of a water-soluble azo compound of the present invention represented by the following formula (6) was obtained as a sodium salt.

Formula (6):

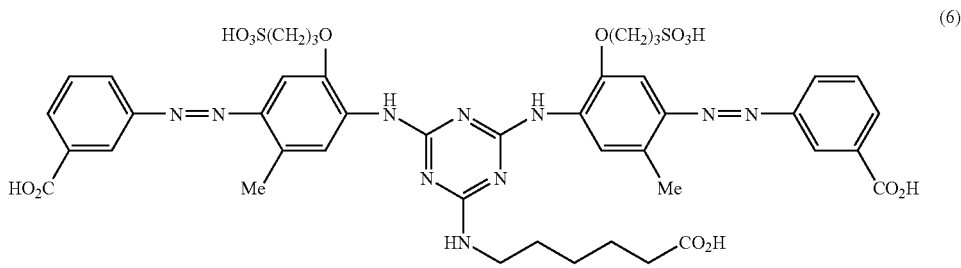

Example 3

In the same manner as in Example 1 except that 22.6 parts of 12-aminododecanoic acid was used instead of 9.3 parts of beta-alanine in Example 1, 31.0 parts of a water-soluble azo compound of the present invention represented by the following formula (7) was obtained as a sodium salt.

Formula (7):

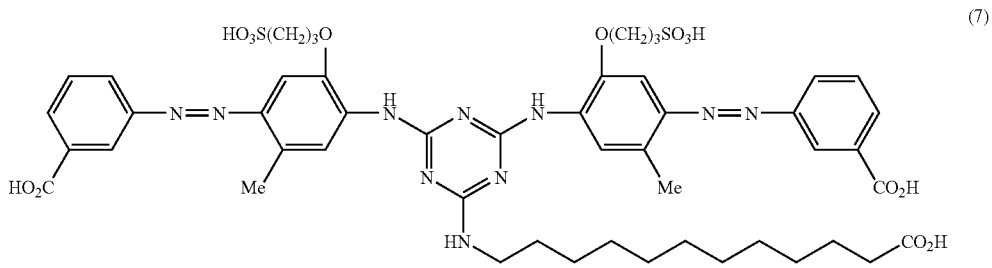

Example 4

In 270 parts of water, 29.0 parts of the water-soluble azo compound of the present invention represented by the above formula (5) obtained in Example 1 was dissolved, and 45 parts of ammonium chloride was added to the aqueous solution. After that, the mixture was adjusted to pH 1 to 3 with hydrochloric acid and stirred for 30 minutes for salt exchange reaction from sodium salt to ammonium salt, and then the precipitated solid was separated by filtration to obtain 120 parts of a wet cake. This wet cake was washed with 200 parts of methanol and then dried at 80° C. using a hot air dryer to obtain 26.0 parts of ammonium salt of a water-soluble azo compound ($\lambda$max: 421 nm) of the present invention represented by the above formula (5).

Example 5

In the same manner as in Example 4 except that 30.0 parts of the water-soluble azo compound represented by the above formula (6) was used instead of the 29.0 parts of the water-soluble azo compound of the present invention represented by the above formula (5) in Example 4, 27.0 parts of ammonium salt of the water-soluble azo compound ($\lambda$max: 391 nm) of the present invention represented by the above formula (6) was obtained.

Example 6

In the same manner as in Example 4 except that 31.0 parts of the water-soluble azo compound represented by the above formula (7) was used instead of 29.0 parts of the water-soluble azo compound of the present invention represented by the above formula (5) in Example 4, 28.0 parts of ammonium salt of the water-soluble azo compound ($\lambda$max: 405 nm) of the present invention represented by the above formula (7) was obtained.

Examples 7 to 9

(A) Preparation of Ink

Each of the azo compounds (the ammonium salts of the formula (5) to (7)) of the present invention obtained in the above Examples 4 to 6 was mixed with the other components in the composition ratio shown in Table 2 to obtain each ink composition of the present invention containing each compound. The obtained ink compositions were respectively filtered using a 0.45 μm membrane filter to remove foreign substances off in order to prepare inks containing a compound of the present invention. In this regard, ion-exchanged water was used as water, the pH of the ink compositions was adjusted to about 9.5 with ammonia water, and then water was added to adjust the total amount of each ink to 100 parts. The ink using the compound (ammonium salt of the formula (5)) of Example 4 is Example 7, the ink using the compound (ammonium salt of the formula (6)) of Example 5 is Example 8, and the ink using the compound (ammonium salt of the formula (7)) of Example 6 is Example 9.

TABLE 2

| (composition ratio of ink composition) | |
|---|---|
| The azo compound obtained in Example 4, 5 or 6 | 3.5 parts |
| Glycerine | 10.0 parts |
| 2-Pyrrolidone | 10.0 parts |
| Trimethylolpropane | 5.0 parts |

TABLE 2-continued (composition ratio of ink composition)

| | |
|---|---|
| Tergitol<sup>RTM</sup> 15-S-7 (Note) | 1.0 part |
| Ammonia water + water | 70.5 parts |
| Total | 100.0 parts |

(Note): Polyglycol ether-based nonionic surfactant, manufactured by SIGMA-ALDRICH.

Comparative Example 1

By the same procedure as in Examples 7 to 9 except that the coloring matter (ammonium salt) described in the example 10 in Patent Literature 1 was used instead of the azo compounds obtained Examples 4 to 6 as a coloring matter, an ink having the same composition ratio as in Table 2 was prepared for comparison. The structural formula of the compound used is shown in the following formula (8), (ammonium salt; λmax: 377 nm).

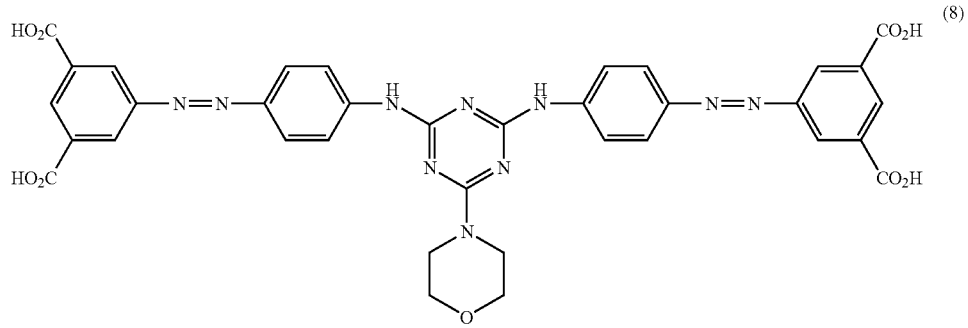

(8)

Comparative Example 2

By the same procedure as in Examples 7 to 9 except that the ammonium salt of the compound described in Example 1 of Patent Literature 2 was used instead of the azo compounds obtained in Examples 4 to 6 as a coloring matter, an ink having the same composition ratio as in Table 2 was prepared for comparison. The structural formula of the compound used is shown in the following formula (9), (ammonium salt; λmax: 391 nm).

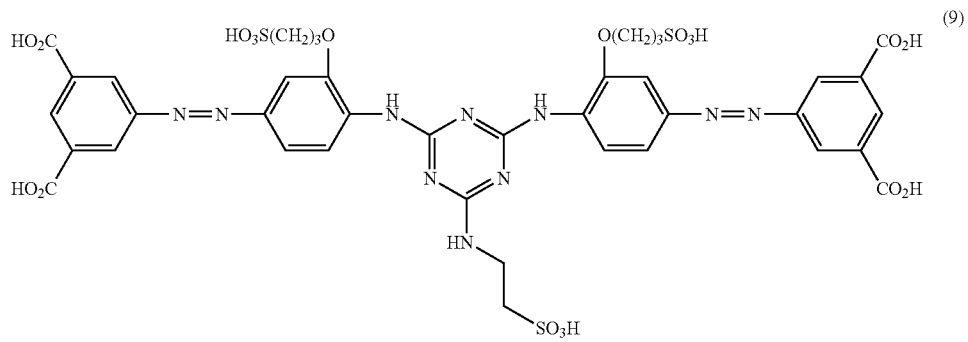

(9)

Comparative Example 3

A compound (sodium salt) of the following formula (10) was obtained using 13.1 parts of taurine instead of 9.3 parts of beta-alanine used in Example 1. An ammonium salt (λmax: 421 nm) of this compound of the formula (10) was obtained via the same procedure as in Example 4. This compound is the compound of Compound Number 10 described in Table 1 (examples of compound) in Patent Literature 2. By the same procedure as in Examples 7 to 9 except that ammonium salt of the obtained compound of the formula (10) was used instead of the azo compounds obtained in Examples to 6 as a coloring matter, an ink having the same composition ratio as in Table 2 was prepared for comparison.

Formula (10)

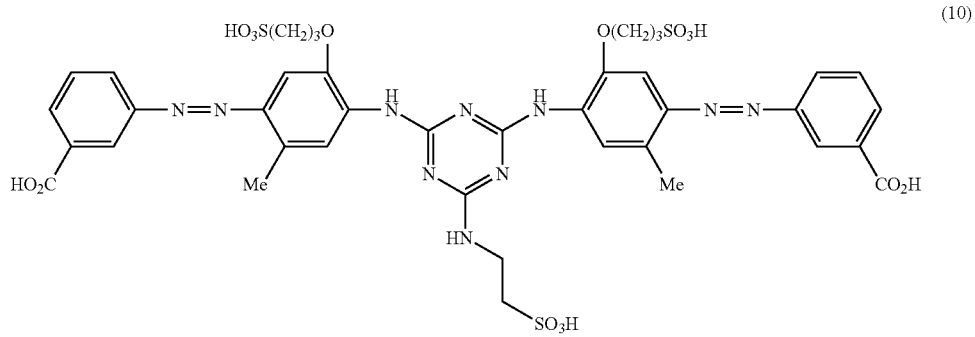

(10)

Comparative Example 4

A compound of the following formula (11) was obtained using 7.9 parts of glycine instead of 9.3 parts of beta-alanine used in Example 1. An ammonium salt (λmax: 421 nm) of this compound of the formula (11) was obtained via the same procedure as in Example 4. By the same procedure as in Examples 7 to 9 except that ammonium salt of the obtained compound of the formula (11) was used instead of the azo compounds obtained in Examples 4 to 6 as a coloring matter, an ink having the same composition ratio as in Table 2 was prepared for comparison. This compound corresponds to the compound of the above formula (1) wherein R is methyl, n is 1, x is 3 and y is 1, and because y is 1, it is not in the scope of the present invention.

For assessment by visual observation in water fastness test, a printed matter of the checked pattern was used.

For measurement of the coloring matter residual rate in water fastness test, a printed matter of the gradation was used and measurement of the reflection density before and after the test was conducted on the part of the printed matter where the reflection density, D value, before the test had been nearest to 1. In this regard, the reflection density was measured using a colorimetric system (trade name: SpectroEye®, manufactured by GretagMacbeth).

Evaluation of recorded image (C), water fastness tests 1 to 3, and their results are sequentially described after the following Table 3.

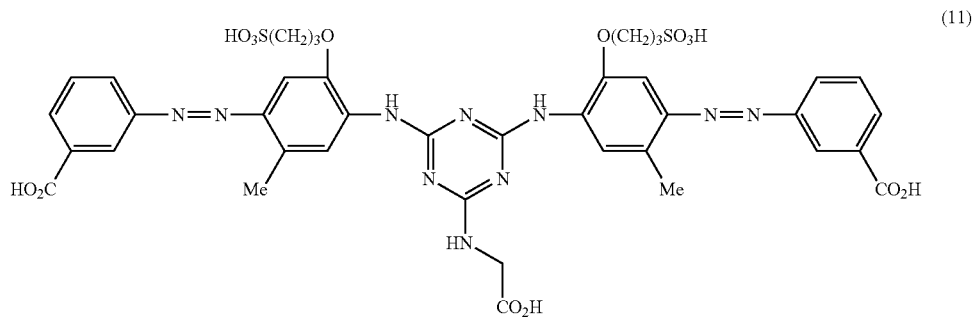

(11)

(B) Inkjet Printing

Using an inkjet printer (trade name: PIXUS® ip4100, manufactured by Canon Inc.), inkjet recording was performed on 4 kinds of plain paper shown in Table 3. For the inkjet recording, the following 2 image patterns were recorded.
(i) For the inkjet recording, a checked pattern (which is a pattern where 1.5 mm-squares having a density of 100% and 1.5 mm-squares having a density of 0% were alternately placed) was made and a yellow/white printed matter having high contrast was obtained. In this regard, the white part was the surface of plain paper not colored with the ink.
(ii) An image pattern was made so that it could have several gradations in reflection density, and a printed matter having a yellow density gradation was obtained.

TABLE 3

| Plain paper 1: |
| --- |
| Manufactured by Canon Inc. Trade name: LBP PAPER LS-500. |
| Plain paper 2 |
| Manufactured by Hewlett Packard Trade name: Multipurpose Paper. |
| Plain paper 3: |
| Manufactured by Hewlett Packard Trade name: All-in-One Printing Paper. |
| Plain paper 4: |
| Manufactured by Seiko-Epson Corporation Both side-high quality plain paper KA4250NPD. |

(C) Evaluation of Recorded Image

Using the above colorimetric system, measured were brightness L* value, a* value, b* value, color saturation C* value, hue angle h value of the part where the yellow reflection density, Dy value, was nearest to 1.0, on the printed matter of the gradation.

For L*, C*, h, C*/L* and Dy value, the results on plain paper 1 are depicted in Table 4, the results on plain paper 2 are depicted in Table 5, the results on plain paper 3 are depicted in Table 6, and the results on plain paper 4 are depicted in Table 7, respectively (where a* values and b* values are omitted). In this regard, the hue angle h is an angle in the case where the hue at around 90 degrees is yellow. In addition, it is preferred to evaluate vividness of coloring matter under the equal brightness L* value condition and so C*/L* value is depicted together with C* value and L* value.

TABLE 4

Plain paper 1

| | L* | C* | h | C*/L* | Dy |
|---|---|---|---|---|---|
| Example 7 | 78.6 | 74.0 | 89.3 | 0.94 | 1.13 |
| Example 8 | 80.2 | 72.8 | 87.9 | 0.91 | 1.09 |
| Example 9 | 80.1 | 71.3 | 90.0 | 0.89 | 1.07 |
| Comparative Example 1 | 85.2 | 65.8 | 98.7 | 0.77 | 0.93 |
| Comparative Example 2 | 84.1 | 67.5 | 95.1 | 0.80 | 0.96 |
| Comparative Example 3 | 79.5 | 71.8 | 89.3 | 0.90 | 1.07 |
| Comparative Example 4 | 78.7 | 70.5 | 89.7 | 0.90 | 1.08 |

TABLE 5

Plain paper 2

| | L* | C* | h | C*/L* | Dy |
|---|---|---|---|---|---|
| Example 7 | 81.1 | 67.9 | 89.7 | 0.84 | 1.01 |
| Example 8 | 80.2 | 65.0 | 87.9 | 0.87 | 1.04 |
| Example 9 | 81.4 | 68.0 | 89.5 | 0.83 | 1.00 |
| Comparative Example 1 | 87.5 | 65.0 | 98.2 | 0.74 | 0.89 |
| Comparative Example 2 | 86.2 | 68.0 | 94.2 | 0.79 | 0.95 |
| Comparative Example 3 | 79.5 | 67.5 | 89.3 | 0.85 | 1.02 |
| Comparative Example 4 | 77.3 | 66.2 | 89.6 | 0.86 | 1.03 |

TABLE 6

Plain paper 3

| | L* | C* | h | C*/L* | Dy |
|---|---|---|---|---|---|
| Example 7 | 82.8 | 69.9 | 89.2 | 0.84 | 1.01 |
| Example 8 | 81.7 | 71.0 | 87.5 | 0.87 | 1.04 |
| Example 9 | 81.2 | 69.2 | 89.7 | 0.85 | 1.02 |
| Comparative Example 1 | 87.4 | 68.6 | 97.4 | 0.78 | 0.94 |
| Comparative Example 2 | 86.8 | 67.1 | 94.4 | 0.77 | 0.93 |
| Comparative Example 3 | 78.9 | 63.7 | 89.1 | 0.81 | 0.97 |
| Comparative Example 4 | 80.3 | 64.2 | 90.5 | 0.80 | 0.96 |

TABLE 7

Plain paper 4

| | L* | C* | h | C*/L* | Dy |
|---|---|---|---|---|---|
| Example 7 | 79.6 | 65.6 | 90.8 | 0.82 | 0.99 |
| Example 8 | 74.2 | 65.1 | 89.9 | 0.88 | 1.05 |
| Example 9 | 79.9 | 65.3 | 92.0 | 0.82 | 0.98 |
| Comparative Example 1 | 84.7 | 57.4 | 100.2 | 0.68 | 0.81 |
| Comparative Example 2 | 83.0 | 64.5 | 95.2 | 0.78 | 0.93 |
| Comparative Example 3 | 74.9 | 60.3 | 91.8 | 0.81 | 0.97 |
| Comparative Example 4 | 80.7 | 66.6 | 91.6 | 0.83 | 0.99 |

(D) Water Fastness Test 1

Evaporative Drying Test

On the printed matter of the checked pattern dried for 1 hour after printing, a drop of ion-exchanged water was added, and the matter was naturally dried as it is. After drying, the pattern blurring degree was evaluated by visual observation and evaluated on three levels according to the following criteria.

| | |
|---|---|
| No blurring (it is impossible to determine where it was dropped) | ○ |
| Almost no blurring (it is possible to determine where it was dropped) | Δ |
| Apparent blurring | X |

The results are shown in Table 8.

(E) Water Fastness Test 2

Immersion Test 1

The printed matter of the checked pattern dried for 24 hours after printing was immersed in ion-exchanged water for 1 hour. After drying, the degree of discoloring on the patterned part and the degree of coloring on the white part were evaluated by visual observation and evaluated on three levels according to the following criteria.

| | |
|---|---|
| No discoloring nor coloring | ○ |
| Discoloring and coloring are slightly observed | Δ |
| Discoloring and coloring are apparently observed | X |

The results are shown in Table 9.

(F) Water Fastness Test 3

Immersion Test 2

The printed matter of the gradation dried for 24 hours after printing was immersed in ion-exchanged water for 1 hour. Using the above colorimetric system, the reflection density of the matter after the immersion was again measured on the part of the matter where the reflection density, Dy value, had been nearest to 1 in measurement of the reflection density before the test. After the measurement, the coloring matter residual rate was calculated from (reflection density after test/reflection density before test)×100(%) and evaluated on 4 levels according to the following criteria.

| | |
|---|---|
| Coloring matter residual rate is 90% or more | ⊙ |
| Coloring matter residual rate is 80% or more and under 90% | ○ |

-continued

| | |
|---|---|
| Coloring matter residual rate is 50% or more and under 80% | Δ |
| Coloring matter residual rate is under 50% | X |

The results are shown in Table 10.

TABLE 8

Result of water fastness test 1

| | (plain paper 1) | (plain paper 2) | (plain paper 3) | (plain paper 4) |
|---|---|---|---|---|
| Example 7 | ○ | ○ | ○ | Δ |
| Example 8 | ○ | ○ | ○ | ○ |
| Example 9 | ○ | ○ | ○ | ○ |
| Comparative Example 1 | ○ | ○ | ○ | Δ |
| Comparative Example 2 | ○ | ○ | ○ | Δ |
| Comparative Example 3 | ○ | X | ○ | X |
| Comparative Example 4 | ○ | X | ○ | X |

TABLE 9

Result of water fastness test 2

| | (plain paper 1) | (plain paper 2) | (plain paper 3) | (plain paper 4) |
|---|---|---|---|---|
| Example 7 | Δ | Δ | Δ | ○ |
| Example 8 | Δ | Δ | Δ | ○ |
| Example 9 | ○ | ○ | ○ | ○ |
| Comparative Example 1 | Δ | Δ | Δ | Δ |
| Comparative Example 2 | Δ | Δ | X | X |
| Comparative Example 3 | X | Δ | X | Δ |
| Comparative Example 4 | X | X | X | Δ |

TABLE 10

Result of water fastness test 3

| | (plain paper 1) | (plain paper 2) | (plain paper 3) | (plain paper 4) |
|---|---|---|---|---|
| Example 7 | ○ | ⊚ | ⊚ | ○ |
| Example 8 | ○ | ⊚ | ⊚ | ○ |
| Example 9 | ⊚ | ⊚ | ⊚ | ⊚ |
| Comparative Example 1 | Δ | ⊚ | ⊚ | ○ |
| Comparative Example 2 | X | Δ | ⊚ | ○ |
| Comparative Example 3 | Δ | Δ | ⊚ | Δ |
| Comparative Example 4 | Δ | X | Δ | Δ |

As is clear from the results of Tables 4 to 7, color saturation C* value and C*/L* value of color saturation C* divided by brightness L* varies depending on the kind of plain paper in any of Examples 7 to 9 and Comparative Examples 1 to 4, and no big difference is observed except that Comparative Examples 1 and 2 lead overall to relatively low values.

Judging from the above results, Examples 7 to 9 are on the same level as Comparative Examples 3 and 4 and apparently superior to Comparative Examples 1 and 2 in color evaluation for yellow printed on each plain paper.

In addition, in the evaluation results of water fastness test 1 in Table 8, there are differences on plain paper 2, showing that Examples 7 to 9 exhibit water fastness superior to Comparative Examples 3 and 4. Further, differences are observed on plain paper 4, and it is found that Example 8 and Example 9 have high water fastness. Furthermore, on plain paper 4, the water fastness of Example 7 is on the almost same level as those of Comparative Example 1 and 2 and superior to Comparative Examples 3 and 4.

The evaluation result of water fastness test 2 in Table 9 shows that Example 9 exhibits very good water fastness on plain paper 1. The water fastness of Examples 7 and 8 is on the same level as those of Comparative Example 1 and 2 and superior to those of Comparative Examples 3 and 4.

Also on plain paper 2, Example 9 exhibits very good water fastness, and Examples 7 and 8 exhibit the same level of water fastness as Comparative Examples 1 to 3. Comparative Example 4 has very poor water fastness.

Also on plain paper 3, Example 9 exhibits very good water fastness, and Examples 7 and 8 exhibit the same level of water fastness as Comparative Example 1. Comparative Examples 2 to 4 have poor water fastness.

On plain paper 4, any of Examples 7 to 9 exhibits good water fastness and is apparently superior to any of Comparative Examples 1 to 4.

The evaluation result of water fastness test 3 in Table 10 shows that each Example exhibits water fastness superior to each Comparative Example on plain paper 1.

Also on plain paper 2, each Example exhibits superior water fastness, which is on the same level as Comparative Example 1 but apparently superior in comparison with Comparative Examples 2 to 4.

Also on plain paper 3, each Example exhibits very superior water fastness, which is on the same level as Comparative Examples 1 to 3 but is apparently superior to Comparative Example 4.

On plain paper 4, Example 9 exhibits very superior water fastness, and Examples 7 and 8 also exhibit superior water fastness. The water fastness of Examples 7 and 8 is on the same level as those of Comparative Examples 1 and 2 but apparently superior in comparison with those of Comparative Examples 3 and 4.

From the results in Tables 8 to 10, it is found that Examples 7 to 9 of the present invention exhibit a certain level or more of water fastness on any of plain papers 1 to 4 in any water fastness test and thus stably exhibit water fastness on various kinds of plain paper. On the other hand, it is found that stable water fastness is not obtained in Comparative Examples because the compound of Comparative Example 1 exhibits the same level of water fastness as the compound of the present invention while Comparative Examples 2 to 4 exhibit a coloring matter residual rate of 50% or less (X) on a plurality of plain papers in at least any of the tests.

In addition, the results in water fastness of the coloring matter of the present invention indicate Example 7<Example 8<Example 9, resulting in that water fastness is more excellent as y value is larger in the azo compound of the present invention represented by the above formula (1).

Further, Comparative Example 4 using a compound corresponding to the case where y is 1 in the above formula (1) is apparently inferior in any of the water fastness tests compared with Example 7 using the compound of the present invention where y is 2; and it is found that water fastness is significantly excellent when y is 2 or more.

Furthermore, in comparison with the compound of the above formula (1) where the carboxy group of —($CH_2$)yCOOH is replaced by a sulfo group (—$SO_3H$), Example 7 using the compound of the formula (5) of the present invention corresponding to the compound to the above formula (10) having —($CH_2$)$_2$$SO_3H$ which is used in Comparative Example 3 exhibits a certain level or more of water fastness on various plain papers in any of the water fastness tests while Comparative Example 3 has a coloring matter residual rate of 50% or less (X) on 2 kinds of plain paper in water fastness tests 1 and 2 and it is inferior to Example 7 on 3 kinds of plain paper in water fastness test 3 although it does not have a coloring matter residual rate of 50% or less (X) and it is found that the compound of the present invention having a carboxy group is significantly excellent.

INDUSTRIAL APPLICABILITY

Judging from the above results, the water-soluble azo compound of the present invention is suitable for preparation of ink compositions for inkjet recording and extremely excellent in various fastnesses, particularly in water fastness on various kinds of plain paper in comparison with conventional coloring matters, and it has high water-solubility, excellent coloring properties particularly on plain paper, a vivid hue and good color saturation. From these characteristics, it is clear that the azo compound of the present invention is a very useful compound as an ink coloring matter for various kinds of recording, particularly as a yellow coloring matter for inkjet inks.

The invention claimed is:

1. A water-soluble azo compound represented by the following formula (1) or a salt thereof:

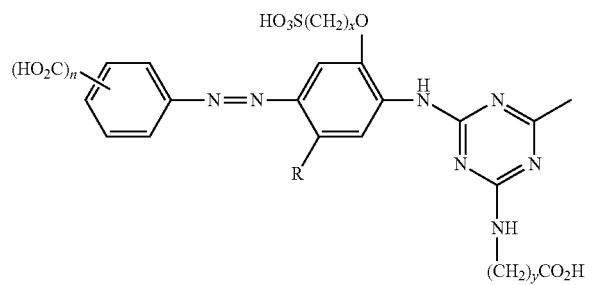

(1)

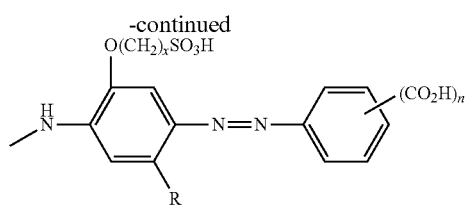

wherein, R is a methyl group, n is 1, x is 3 and y represents an integer number of 5 to 11, respectively.

2. The water-soluble azo compound or a salt thereof according to claim 1, which is represented by the following formula (2):

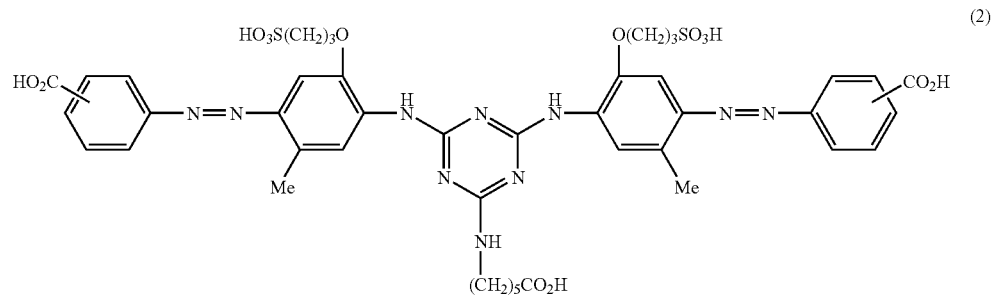

wherein, Me represents a methyl group.

3. An ink composition containing the water-soluble azo compound or a salt thereof according to claim 1.

4. The ink composition according to claim 3, which contains a water-soluble organic solvent.

5. The ink composition according to claim 3, which is for inkjet recording.

6. An inkjet recording method comprising discharging an ink droplet of either the ink composition according to claim 3 or the ink composition according to claim 3 containing a water-soluble organic solvent in response to a recording signal to perform recording on a record-receiving material.

7. The inkjet recording method according to claim 6, wherein the record-receiving material is a communication sheet.

8. The inkjet recording method according to claim 7, wherein the communication sheet is a plain paper or a sheet having an ink receiving layer containing a porous white inorganic substance.

9. A colored product colored with any of (a) the water-soluble azo compound or a salt thereof according to claim 1 or 2, (b) an ink composition containing the water-soluble azo compound or a salt thereof according to claim 1 or 2, or (c) an ink composition containing the water-soluble azo compound or a salt thereof according to claim 1 or 2 and a water-soluble organic solvent.

10. The colored product according to claim 9, wherein coloring is performed by an inkjet printer.

11. An inkjet printer comprising a container containing the ink composition according to claim 3.

* * * * *